US006652007B1

(12) United States Patent
Hwang

(10) Patent No.: US 6,652,007 B1
(45) Date of Patent: Nov. 25, 2003

(54) CONNECTOR OF A FUEL PIPE FOR VEHICLE

(76) Inventor: Hyun Sik Hwang, 202-1001, Hyundae Yeonyein Apt., 685-70, Seoul 152-050 (KR)

(*) Notice: Subject to any disclaimer, the term of this patent is extended or adjusted under 35 U.S.C. 154(b) by 0 days.

(21) Appl. No.: 10/110,464
(22) PCT Filed: Apr. 17, 2000
(86) PCT No.: PCT/KR00/00355
§ 371 (c)(1), (2), (4) Date: Apr. 12, 2002
(87) PCT Pub. No.: WO01/36810
PCT Pub. Date: May 25, 2001

(30) Foreign Application Priority Data

Nov. 16, 1999 (KR) .................................. 1999/50830

(51) Int. Cl.[7] .............................................. F16L 37/133
(52) U.S. Cl. ...................... 285/305; 285/308; 285/319; 285/321
(58) Field of Search ................................ 285/308, 319, 285/305, 317, 921, 321

(56) References Cited

U.S. PATENT DOCUMENTS

| 5,090,747 | A | * | 2/1992 | Kotake | 285/305 |
| 5,201,552 | A | * | 4/1993 | Hohmann et al. | 285/124.4 |
| 5,374,088 | A | * | 12/1994 | Moretti et al. | 285/305 |
| 5,941,577 | A | * | 8/1999 | Musellec | 285/317 |
| 6,082,779 | A | * | 7/2000 | Lesser et al. | 285/93 |
| 6,086,119 | A | * | 7/2000 | Hansel | 285/309 |
| 6,142,537 | A | * | 11/2000 | Shimada et al. | 285/308 |
| 6,318,764 | B1 | * | 11/2001 | Trede et al. | 285/305 |

* cited by examiner

Primary Examiner—David Bochna
(74) Attorney, Agent, or Firm—Straub & Pokotylo; John C. Pokotylo

(57) ABSTRACT

Disclosed is a connector of a fuel pipe for vehicle, which can be easily mounted on or separated from a connector housing by adjusting a latch. The latch includes guide members oppositely located at a prescribed interval, push members vertically located away from the opposite sides of the guide members, and two pair waved resilient members disposed on the upper and lower portions of the guide members. Each guide member has a curved inner surface, a slant surface on the front portion for guiding an insertion of the pipe, a fixed jaw on the rear portion for retaining a bead formed on the peripheral surface of the pipe, and a guide groove formed in the center portion thereof. The two pair waved resilient members elastically connect the push members and the guide members to provide a powerful elastic force to the two pair waved resilient members, so that the guide members are extended outward when the push members are pressed. The connector housing has a guide rail combined with the guide grooves of the latch, thereby allowing the guide members to move back and forth. When the pipe is mounted in or separated from the connector, the guide members are extended outward in a perfect round shape, so that the pipe is easily mounted or detached and is prevented from a separation since the two pair waved resilient members elastically retain a bead of the pipe after mounting.

9 Claims, 5 Drawing Sheets

CONNECTOR OF A FUEL PIPE FOR VEHICLE

FIELD OF THE INVENTION

The present invention relates to a connector of a fuel pipe for vehicle, and more particularly, to a connector of a fuel pipe for vehicle, in which an insertion hole formed between guide members of a latch are extended or narrowed in a perfect round shape, thereby smoothly mounting and separating a pipe.

BACKGROUND OF THE INVENTION

In general, a fuel system, which provides an engine with necessary fuel in all operation condition to be easily burned, is an important apparatus which influences a performance, especially output, and economization of the engine. A fuel injection system, which is a principal part of the fuel system, provides the engine with fuel properly.

A fuel feed apparatus comprises a fuel tank for storing fuel, a fuel filter for removing foreign matters from the fuel, a fuel pump for delivering the fuel, and a canister for preventing gasoline vapor from being discharged in the air when the engine is stopped. The components are connected to each other through fuel pipes.

FIG. 1 is a flow chart showing a general flow of fuel. As shown in FIG. 1, a fuel feed pipe 10 connects a fuel pump 16, which forcedly delivers the fuel stored in a fuel tank 12 toward an engine 14, to a fuel injection rail 20 through a fuel filter 18. The fuel feed pipe 10 supplies all injectors (not shown) with equal pressure and amount from the fuel. A fuel recovery pipe 22 returns the remainder of fuel from the fuel injection rail 20 into the fuel tank 12. That is, although the fuel pump 16 delivers a predetermined amount of fuel toward the engine 14, the fuel system remains a small amount of fuel, as maintaining the pressure of about 3 kg/cm3. Therefore, the remainder of fuel is returned into the fuel tank 12 through the fuel recovery pipe 22.

When the engine is stopped, evaporative fuel gas to be vaporized in the fuel tank 12 is collected and stored into a canister 24. The canister 24 is connected to the engine 14 and the fuel tank 12 through evaporative fuel gas connecting pipes 26. The diameter of the pipe is about 8 to 10 mm. Connectors 28 are disposed on joint portions of the pipes. As the connectors 28 are required on joint portions of the steel pipes and plastic pipes.

However, the conventional steel tube made of metal is very heavy and can be corroded. The rubber tube is light, but must be coated with fluoride film not to be melted with gasoline, thereby causing a rise of manufacturing cost. Furthermore, because a large volume of hydrocarbon existing in gasoline goes through the inner wall of the rubber tube and is discharged in the air, thereby causing environmental pollution.

To solve the above problems, various kinds of tubes which are made of special plastics in place of steel or rubber are proposed, and recently, technique related to the connector for easily connecting and separating the plastic tube is being lively developed.

Meanwhile, a connector made of plastic tube for connecting fuel pipes of vehicle is disclosed in U.S. Pat. No. 5,374,088. As shown in FIGS. 2 and 3, a latch 30 is inserted into a side of a connector housing (not shown) and fixed jaws 32 are formed on the latch 30 for latching a bead 42 formed on the peripheral surface of a pipe 40. Push members 34 are elastically connected to the opposite sides of the fixed jaws 32 by resilient members 36 to elastically extend and narrow a space between the fixed jaws 32.

In the conventional connector of the fuel pipe, when the pipe 40 is inserted into the space between the fixed jaws 32 of the latch 30 and the bead 42 of the pipe 40 is contacted to the fixed jaws 32, the space between the fixed jaws 32 is extended over a powerful elastic force of the resilient members 36. At this time, the pipe 40 is inserted into the connector housing as well as the bead 42 of the pipe 40 is caught to the inner portion of the fixed jaws 32 of the latch 30, so that the pipe 40 is fastened to the connector housing.

However, the elastic force of the resilient members 36 are weak, thereby the pipe 40 is easily separated from a little external power.

To separate the pipe 40 from the space between the fixed jaws 32 of the latch 30, when the fixed jaws 32 are extended outward after pressing the push members 34 formed on the opposite sides of the latch 30, the pipe 40 is separated from the connector.

When the push members 34 of the latch 30 are pressed, the fixed jaws 32 connected to the resilient members 36 are extended outward, thereby separating the pipe 40 from the space between the fixed jaws 32. However, the fixed jaws 32 are extended not in a perfect round but in a distorted round, thereby the bead 42 of the pipe 40 is not smoothly separated from the fixed jaws 32. That is, when the push members 34 are pressed, the pressure must be evenly transferred to the fixed jaws 32 through the medium of the resilient members 36 to maintain its round shape. However, the conventional fixed jaws 32 are distorted when extending, thereby the bead 42 is caught to a portion of the fixed jaws 32 when the pipe 40 is separated from the connector.

SUMMARY OF THE INVENTION

It is, therefore, an object of the present invention to provide a connector of a fuel pipe for vehicle, which allows a pipe to be simply mounted and detached by adjusting a latch.

To accomplish the above object, the present invention provides a connector of a fuel pipe for vehicle, comprising a connector housing installed to a fuel feed pipe, a fuel recovery pipe and an evaporative fuel gas connecting pipe and a latch connected into the connector housing, wherein the latch includes: guide members oppositely located at a prescribed interval, each guide member having a curved inner surface, a slant surface on a front portion thereof for guiding an insertion of the pipe, a fixed jaw on a rear portion thereof for retaining a bead formed on the peripheral surface of the pipe, and a guide groove formed in the center portion thereof; push members vertically located away from the opposite sides of the guide members; and two pair waved resilient members elastically disposed on the upper and lower portions of the guide members, the two pair waved resilient members connecting the push members and the guide members to provide a powerful elastic force to the rear portion of the two pair waved resilient members, so that the guide members are extended outward when the push members are pressed. The guide grooves are combined with a guide rail formed inside the connector housing, thereby extending the guide members in a perfect round shape.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 4:
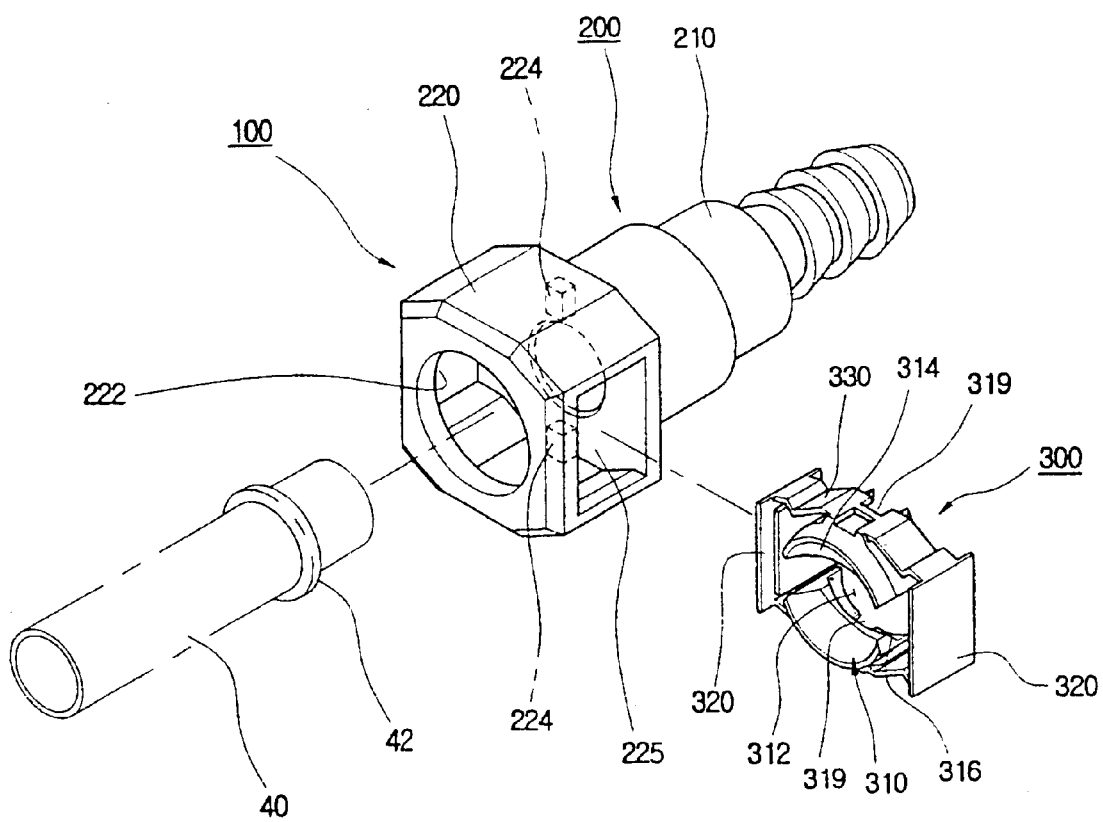
FIG. 4 is an exploded perspective view of an assembled connector according to the present invention.
Figure 5A:
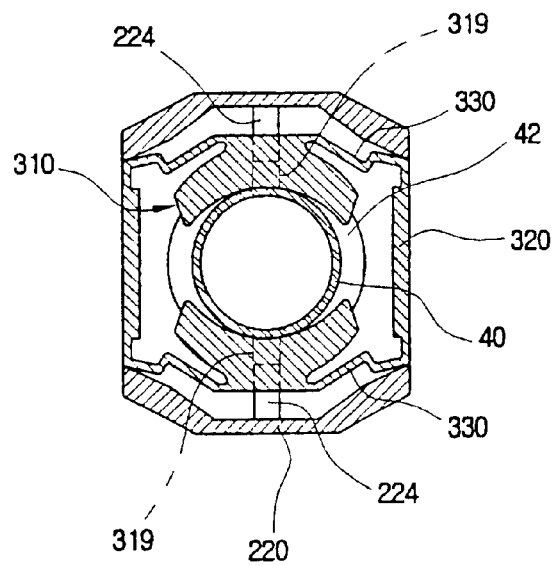
FIG. 5a is a perspective view of the same connector of FIG. 4 with a pipe inserted into the connector in a locked position.
Figure 5B:
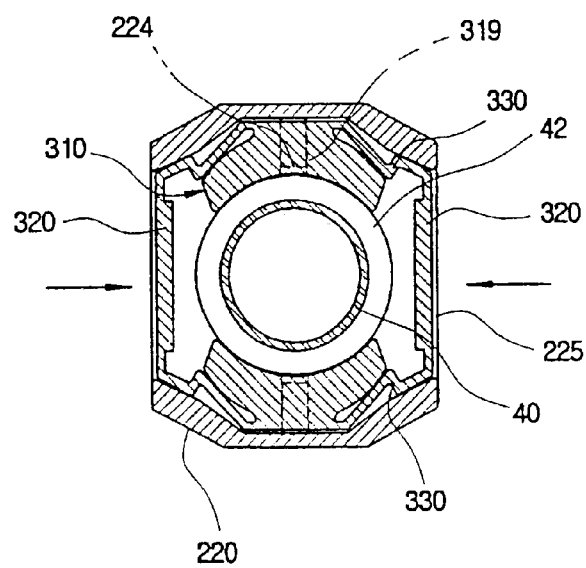
FIG. 5b is a perspective view of the assembled connector with the pipe separated from the connector in a released position.
Figure 6:
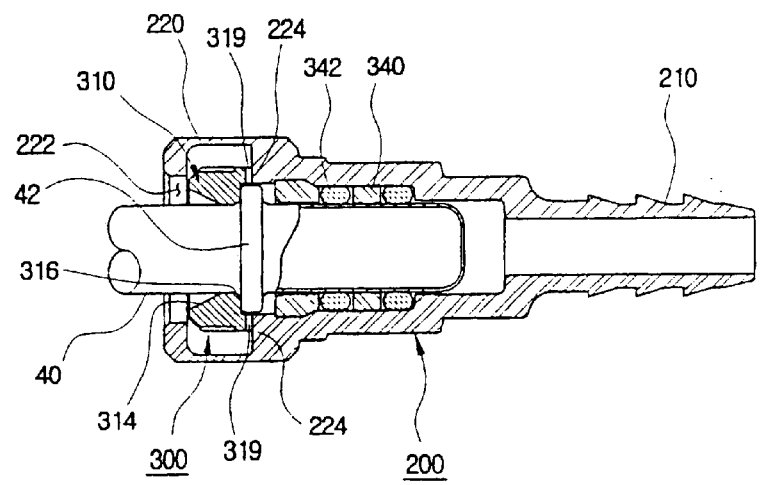
FIG. 6 is a sectional view of the present invention.
Figure 7:
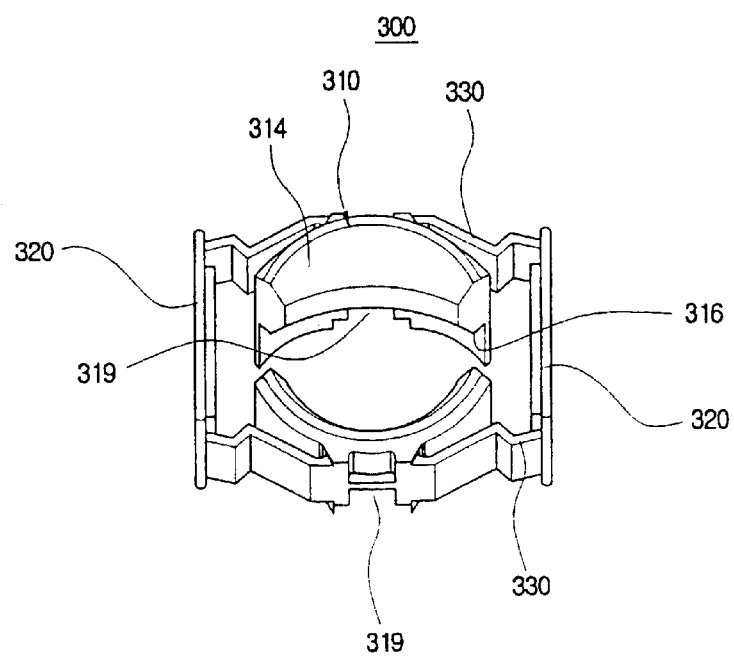
FIG. 7 is a front perspective view of the latch according to the present invention.

FIG. 4 is an exploded perspective view of an assembled connector according to the present invention. FIG. 5a is a perspective view of the same connector of FIG. 4 with a pipe inserted into the connector in a locked position, and FIG. 5b is a perspective view of the assembled connector with the pipe separated from the connector in a released position. FIG. 6 is a sectional view of the assembled state of the present invention, and FIG. 7 is a front perspective view of the latch according to the present invention.

Figure 1:
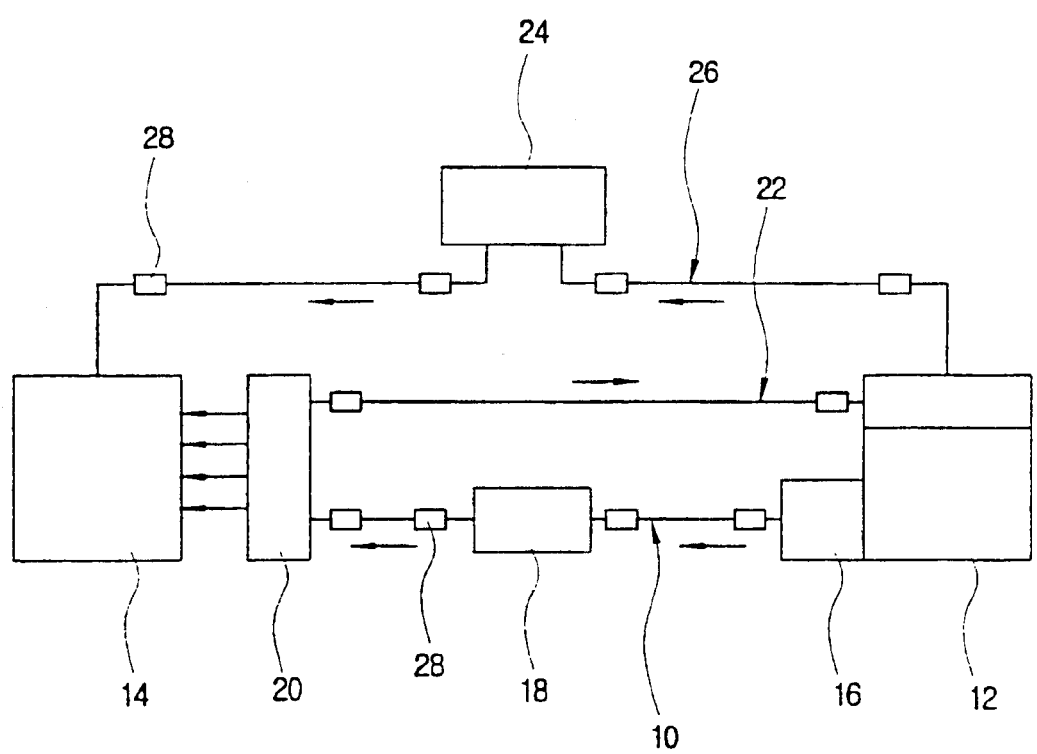
FIG. 1 is a flow chart showing a general flow of fuel.
Figure 2:
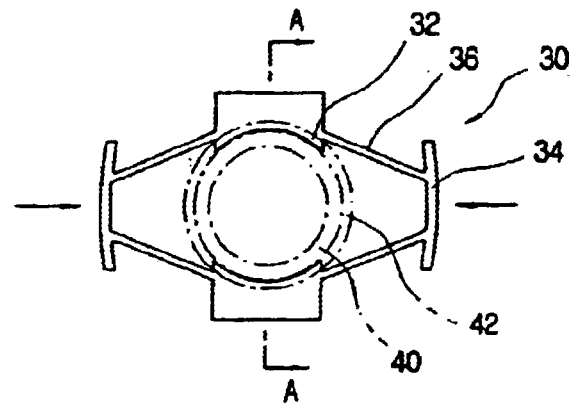
FIG. 2 is a front view of a latch of a conventional connector.
Figure 3:
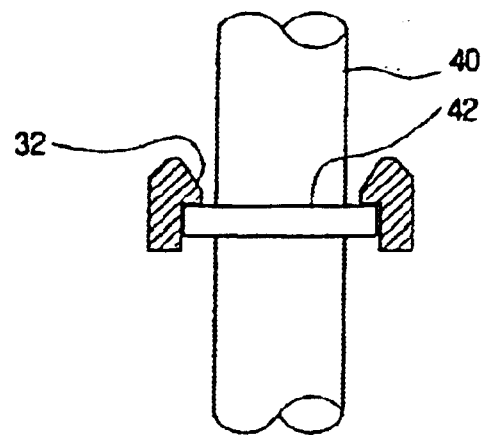
FIG. 3 is a sectional view taken along a line of A—A of FIG. 2.

Referring now to the drawings wherein like reference characters designate corresponding parts throughout several views, FIGS. 1 and 2 show a prior art connector of a fuel pipe. As for to parts with symmetrical shape, the reference characters designate one portion for convenience.

Connectors are connected on a fuel feed pipe, a fuel recovery pipe and an evaporative fuel gas connecting pipe for connecting them. As shown in FIGS. 4 through 6, the connector 100 according to the present invention includes a connector housing 200 and a latch 300.

The connector housing 200 includes a connecting body 210 formed on a portion thereof for inserting a plastic tube (not shown), a joint portion 220 formed on the other portion thereof for inserting a pipe 40, a guide rail 224 formed inside the joint portion 220 for guiding the latch 300 to spread in a perfect round shape, and an opening 225 formed on the side wall thereof for inserting the latch 300 into the joint portion 220.

The joint portion 220 has a through hole 222 for inserting the pipe 40 therethrough. The latch 300 is inserted into the through hole 222 through the opening 225 and allows the pipe 40 to be detachably mounted in the connector 200. The latch 300 includes guide members 310, two pair waved resilient members 330 and push members 320. Each guide member 310 has a slant surface 314 on the front portion thereof for guiding an insertion of the pipe 40, fixed jaws 316 on the rear portion thereof for retaining a bead 42 formed on a peripheral surface of the pipe 40, and a guide groove 319 on a rear center portion thereof. The two pair waved resilient members 330 are disposed on the upper and lower portions of the guide members 310 and between the guide members 310 and push members 320. The two pair waved resilient members 330 allow the guide members 310 to be extended outward by a powerful elastic force when the push members 320 are pressed.

The guide grooves 319 of the guide members 310 are combined with the guide rail 224 protruded from the inside of the joint portion 220 of the connector housing 200.

The guide members 310 with a curved inner surface are oppositely located at a prescribed interval. An insertion hole 312 is formed between the guide members 310.

The push members 320 are vertically arranged on the ends of the two pair waved resilient members 330 and located away from the opposite sides of the guide members 310. The two pair waved resilient members 330 elastically connect the opposite ends of the push members 320 and the guide members 310, so that the guide members 310 are elastically returned after extending outward. The two pair waved resilient members 330 are formed in multistage form, for example, zigzag, thereby transferring pressure to the guide members 310 correctly and evenly when the push members 320 are pressed.

In the drawings, the unexplained reference characters 340 and 342 indicate a sleeve and an O-shaped ring respectively.

The connector 100 of the fuel pipe with the above structure functions as follows.

Referring to FIGS. 4 through 6, when the latch 300 is introduced into the through hole 222 of the connector housing 200 through the opening 225, since the latch 300 is completely inserted into the through hole 222 and located inside the opening 225, the push members 320 are exposed with outside of the connector housing 200 in parallel.

After the latch 300 is combined to the connector housing 200, when the pipe 40 is inserted into the latch 300, the bead 42 of the pipe 40 is in contact with the guide members 310 as well as pushes out the guide members 310 by an insertion force. At this time, the guide members 310 are resiliently extended outward by a powerful elastic force of the two pair waved resilient members 330 (see FIG. 5b).

When the pipe 40 is further inserted into the insertion hole 312 formed between the guide members 310, the extended guide members 310 are returned in their original condition by the powerful elastic force of the two pair waved resilient members 300, thereby the bead 42 of the pipe 40 is caught to the fixed jaw 316 and retained therein (see FIG. 5a).

At this time, the guide members 310 can be slidingly moved since the guide grooves 319 are combined with the guide rail 224. When the pipe 40 is inserted, the guide members 310 are straight moved in the rear direction and extended in a round shape, thereby resulting in preventing the latch 300 from be separated from the connector housing 200.

In the contrary, to separate the pipe 40 from the connector housing 200, when a user presses the push members 320 of the latch 300 by one hand, the two pair waved resilient members 330 are elastically transformed by the pressure. As shown in FIG. 5b, the guide members 310 are extended outward, thereby the diameter of the insertion hole 312 is increased and formed in the perfect round shape. The bead 42, which is caught to the fixed jaw 316, is slipped out from the insertion hole 312, thereby resulting in separating the pipe 40.

As previously described, when the pipe is mounted in or detached from the connector, the guide members are extended or narrowed while slidingly moving along the guide rail of the connector housing, so that the insertion hole is transformed into a perfect round shape, thereby firmly mounting or separating the pipe.

Furthermore, when the push members are pressed, the two pair waved resilient members formed in zigzag allow the pressure to be evenly transferred to the guide members, thereby causing an easy adjustment of the guide members. Moreover, when the pipe is inserted, the two pair waved resilient members elastically press the pipe, thereby securely retaining the pipe.

Those skilled in the art will readily recognize that these and various other modifications and changes may be made to the present invention without strictly following the exemplary application illustrated and described herein and without departing from the true spirit and scope of the present invention, which is set forth in the following claim.

What is claimed is:

1. A connector of a fuel pipe for vehicle which comprises a connector housing mounted on one of a fuel feed pipe, a fuel recovery pipe and an evaporative fuel gas connecting pipe and a latch combined with the connector housing, wherein the latch includes:
       guide members oppositely located at a prescribed interval, each guide member having a curved inner surface, a slant surface on a front portion of the guide member for guiding an insertion of the pipe, a fixed jaw on a rear portion of the guide member for retaining a bead formed on the peripheral surface of the pipe, and a guide groove formed in the center of the guide member;
       push members located away from the opposite sides of the guide members; and
       two pair of waved resilient members connected to the guide members and the push members, so that the pipe is smoothly separated from the force provided to the guide member evenly when the push members are pressed and the pipe and bead are clamped from a powerful elastic force when the pipes are inserted.

2. A connector of a fuel pipe for vehicle as claimed in claim 1, wherein the connector housing includes:

a through hole for inserting the pipe; and
   a guide rail formed inside the connector housing, wherein the guide rail is combined with the guide grooves for allowing the guide members to move back and forth.

3. A connector of a fuel pipe for vehicle as claimed in claim 1, wherein each of the two pair of waved resilient members is bent in a zig-zag.

4. A connector of a fuel pipe for vehicle as claimed in claim 1, wherein each of the two pair of waved resilient members includes two bends.

5. A connector of a fuel pipe for vehicle as claimed in claim 1, wherein when the push members are pressed, a portion of each of the two pairs of waved resilient members comes to abut a portion of an associated one of the guide members.

6. A latch for use with a pipe connector housing, the latch comprising:

a) guide members oppositely located at a prescribed interval, each guide member having a curved inner surface, a slant surface on a front portion of the guide member for guiding an insertion of a pipe, a fixed jaw on a rear portion of the guide members for retaining a bead formed on a peripheral surface of the pipe, and a guide groove formed in the center portion of the guide member;
   b) push members located away from the opposite sides of the guide members; and
   c) two pair of waved resilient members connected to the guide members and the push members, so that force is provided to the guide member evenly when the push members are pressed.

7. The latch of claim 6, wherein each of the two pairs of waved resilient members is bent in a zig-zag.

8. The latch of claim 6, wherein each of the two pairs of waved resilient members includes two bends.

9. The latch of claim 6, wherein when the push members are pressed, a portion of each of the two pairs of waved resilient members comes to abut a portion of an associated one of the guide members.

* * * * *